(12) United States Patent
Balasubramanian et al.

(10) Patent No.: US 9,542,460 B1
(45) Date of Patent: Jan. 10, 2017

(54) OPTIMIZED AUTOCOMPLETION OF SEARCH FIELD

(71) Applicant: International Business Machines Corporation, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/144,226

(22) Filed: May 2, 2016

Related U.S. Application Data

(63) Continuation of application No. 14/944,327, filed on Nov. 18, 2015.

(51) Int. Cl.
*G06F 17/30* (2006.01)

(52) U.S. Cl.
CPC ....... *G06F 17/3056* (2013.01); *G06F 17/3087* (2013.01); *G06F 17/30973* (2013.01)

(58) Field of Classification Search
None
See application file for complete search history.

(56) References Cited

U.S. PATENT DOCUMENTS

| | | | |
|---|---|---|---|
| 7,565,157 B1 | 7/2009 | Ortega et al. |
| 8,078,197 B2 | 12/2011 | Gutierrez et al. |
| 2013/0031106 A1 | 1/2013 | Schechter et al. |
| 2013/0041884 A1 | 2/2013 | Nomula |
| 2013/0054631 A1 | 2/2013 | Govani et al. |
| 2013/0097137 A1 | 4/2013 | Kritt et al. |
| 2014/0280000 A1 | 9/2014 | Subramanian Karthik |
| 2015/0006564 A1 | 1/2015 | Tomkins et al. |

OTHER PUBLICATIONS

Wikipedia, "Autocomplete," Wikipedia: the Free Encyclopedia, Accessed on Oct. 29, 2015, p. 1-5, https://en.wikipedia.org/wiki/Autocomplete#In_search_engines.
Wikipedia, "Incremental Search," Wikipedia: the Free Encyclopedia, Accessed on Oct. 29, 2015, p. 1-4, https://en.wikipedia.org/wiki/Incremental_search.
IBM, "List of IBM Patents or Patent Applications Treated as Related (Appendix P)," Jul. 25, 2016, p. 1-2.
Balasubramanian et al., "Optimized Autocompletion of Search Field," Application and Drawings, Filed on Nov. 18, 2015, 26 Pages, U.S. Appl. No. 14/944,327.

*Primary Examiner* — Hung Le
(74) *Attorney, Agent, or Firm* — Robert C. Bunker

(57) ABSTRACT

A computer receives event information associated with a user. The computer determines one or more social media contacts associated with the event, wherein the social media contacts are further associated with the user. The computer determines one or more terms utilized by the determined one or more social media contacts. The computer detects an input by the user, wherein the input includes one or more characters. The computer determines one or more autocomplete suggestions based on the one or more terms utilized by the determined one or more social media contacts.

1 Claim, 3 Drawing Sheets

OPTIMIZED AUTOCOMPLETION OF SEARCH FIELD

TECHNICAL FIELD

The present invention relates to performing a search, and more particularly to optimizing auto-completion of a search field.

BACKGROUND

In the digital age, the utilization of search engines has become a necessary and essential way of browsing the internet, searching through an inbox of an email client, and utilizing other similar programs. Presently search engines often provide auto-complete suggestions for a user search field based on various factors such as a cached historic popular queries. Providing a user with an auto-complete option saves the user time and provides an overall better experience.

SUMMARY

The present invention provides a method, system, and computer program product for determining search field suggestions. A computer receives event information associated with a user. The computer determines one or more social media contacts associated with the event, wherein the social media contacts are further associated with the user. The computer determines one or more terms utilized by the determined one or more social media contacts. The computer detects an input by the user, wherein the input includes one or more characters. The computer determines one or more autocomplete suggestions based on the one or more terms utilized by the determined one or more social media contacts.

DETAILED DESCRIPTION

Embodiments of the present invention will now be described in detail with reference to the accompanying Figures.

Figure 1:
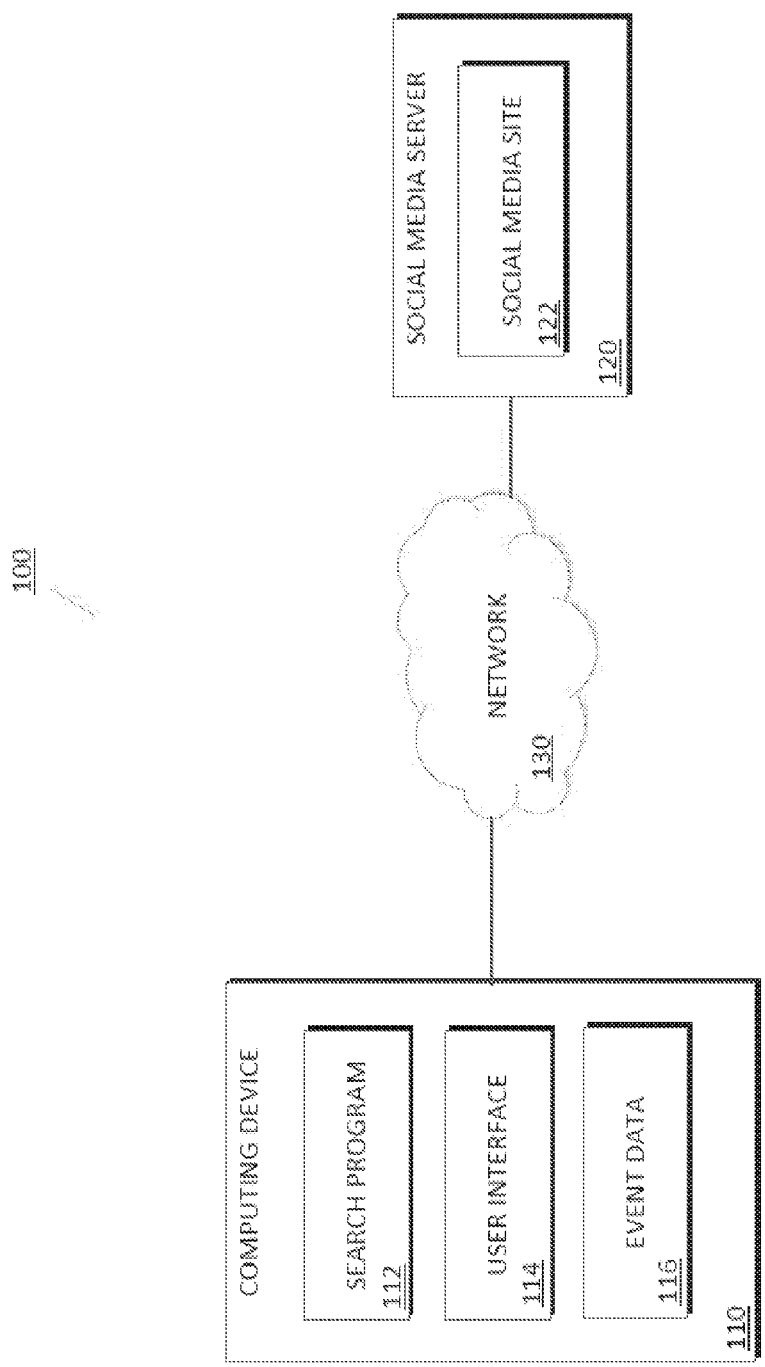
FIG. 1 illustrates an autocomplete system, in accordance with an embodiment of the invention.

FIG. 1 illustrates autocomplete system 100, in accordance with an embodiment of the invention. In an exemplary embodiment, autocomplete system 100 includes computing device 110 and social media server 120 interconnected via network 130.

In the exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110 and social media server 120.

Social media server 120 includes social media website 122. Social media server 120 may be a desktop computer, a notebook, a laptop computer, a tablet computer, a handheld device, a smart-phone, a thin client, or any other electronic device or computing system capable of receiving and sending data to and from other computing devices, such as computing device 110, via network 130. Although not shown, optionally, social media server 120 can comprise a cluster of web servers executing the same software to collectively process the requests for the web pages as distributed by a front end server and a load balancer. In an exemplary embodiment, social media server 120 is a computing device that is optimized for the support of websites which reside on social media server 120, such as social media website 122, and for the support of network requests related to websites, which reside on social media server 120. Social media server 120 is described in more detail with reference to FIG. 3.

Social media site 122 is a collection of files including, for example, hypertext markup language (HTML) files, Cascading Style Sheets (CSS) files, image files and JavaScript files. Social media site 122 can also include other resources such as audio files and video files. In an exemplary embodiment, social media site 122 is a social media website such as Facebook® (Facebook is a registered trademark of Facebook, Inc.), Twitter® (Twitter is a registered trademark of Twitter, Inc.), LinkedIn® (LinkedIn is a registered trademark of LinkedIn, Ltd.), or Myspace® (Myspace is a registered trademark of Myspace, LLC).

Computing device 110 includes search program 112, user interface 114, and event data 116. Computing device 110 may be a desktop computer, a notebook, a laptop computer, a tablet computer, a handheld device, a smart-phone, a thin client, or any other electronic device or computing system capable of receiving and sending data to and from other computing devices, such as social media server 120, via a network, such as network 130. Although not shown, optionally, computing device 110 can comprise a cluster of web devices executing the same software to collectively process requests. Computing device 110 is described in more detail with reference to FIG. 3.

User interface 114 includes components used to receive input from a user and transmit the input to an application residing on computing device 110. In the example embodiment, user interface 114 uses a combination of technologies and devices, such as device drivers, to provide a platform to enable users of computing device 110 to interact with programs present on computing device 110.

In the example embodiment, event data 116 is data which includes information detailing an event or events that the user of computing device 110 is planning to attend, is currently attending, and/or has attended. For example, event data 116 may include information for an event such as the event name, the location of the event, an event guest list, and a start and end date/time for the event.

In the example embodiment, search program 112 is a program capable of detecting when the user of computing device 110 has input information into user interface 114. In an embodiment, search program 112 is fully (or partially) integrated with user interface 114. Search program 112 is also capable of communicating with social media server 120 in order to determine which guests from the guest list are associated with the user of computing device 110. Furthermore, search program 112 is capable of determining one or more search field suggestions based on the determined guests that are associated with the user of computing device 110. The operations and functions of search program 112 are described in more detail with reference to FIG. 2.

Figure 2:
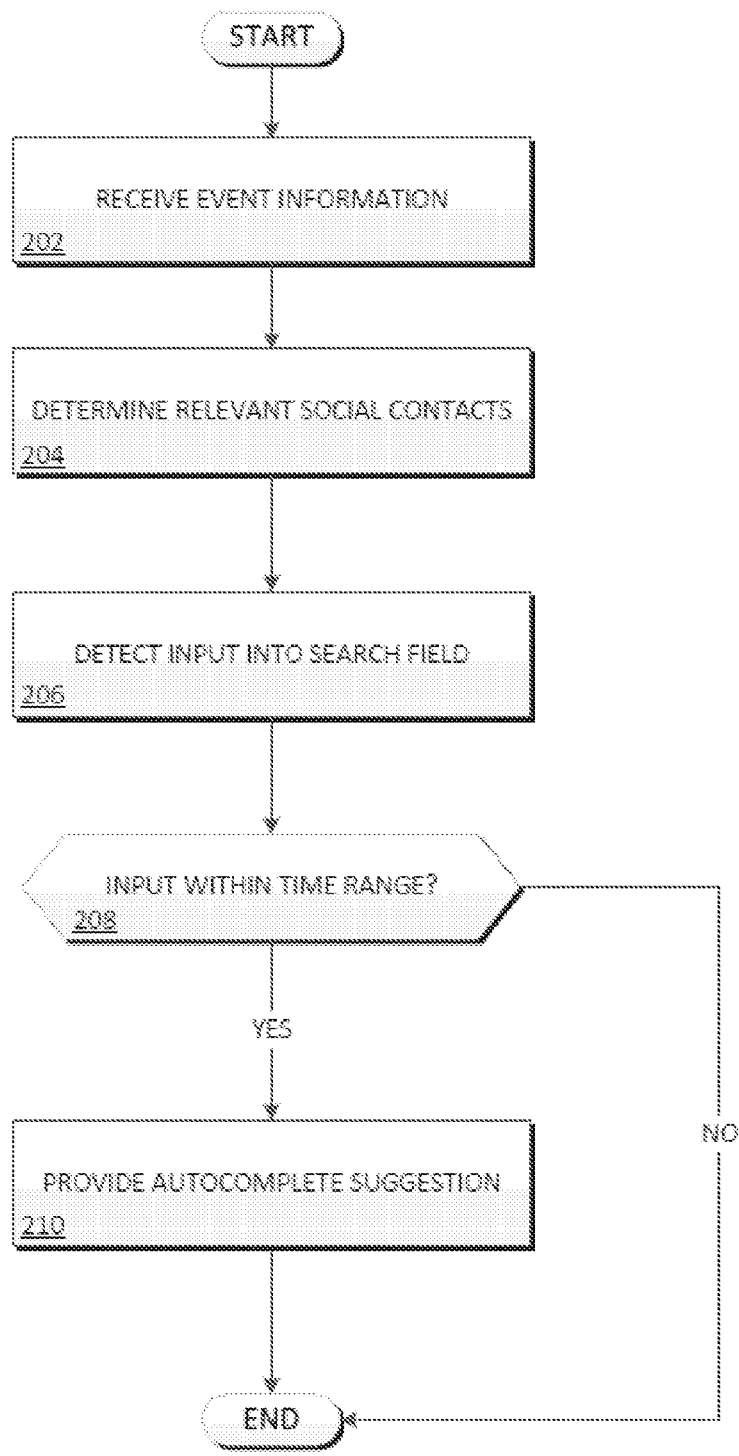
FIG. 2 is a flowchart illustrating the operations of the search program of FIG. 1, in accordance with an embodiment of the invention.

FIG. 2 is a flowchart illustrating the operations of search program 112 in determining one or more autocomplete suggestions, in accordance with an embodiment of the invention. In the example embodiment, search program 112 receives event information (event data 116) via user input via user interface 114 (step 202). In other embodiments, search program 112 identifies event information by referencing a calendar of the user of computing device 110, by referencing electronic invites that have been accepted, and/or referencing social media invites that have been accepted. In the example embodiment, as stated above, event information may include information such as the event name, the location of the event, an event guest list, and a start and end date/time for the event. As stated above, event data 116 may include information for multiple events.

Search program 112 determines social media contacts that are associated with the user of computing device 110 and the event(s) (step 204). In the example embodiment, search program 112 determines social media contacts that are associated with the user of computing device 110 and the event(s) by referencing social media site 122 and comparing one or more guest lists for an event(s) to the social media contacts list of the user of computing device 110. In other embodiments, search program 112 may determine contacts associated with the user of computing device 110 and the event(s) by referencing a rolodex, an email contact list, an instant messaging buddy list, and/or a similar peer-to-peer program.

Search program 112 detects input into a search field (step 206). In the example embodiment, search program 112 detects input into a search field by way of being integrated with user interface 114. Furthermore, search program 112 may be integrated with a web browser and therefore also capable of detecting when the user of computing device 110 inputs information into a search field/address bar within the web browser. In another embodiment, search program 112 monitors the activities of the user of computing device 110 and detects when the user of computing device 110 inputs information into a search field/address bar present on a web browser, into a search field/address bar present within an active or inactive window, or another search field/address bar displayed to the user of computing device 110 via user interface 114.

Search program 112 determines whether the input is detected within a certain time range (decision 208). In the example embodiment, the certain time range may be a time range associated with an event(s) contained within event data 116. For example, if event data 116 details that event 1 is to begin on July $1^{st}$ and finish on July $7^{th}$, search program 112 may determine that the time range associated with event 1 is July $3^{rd}$ to July $7^{th}$. In other embodiments, the user of computing device 110 or a developer may input an extension time which may be utilized by search program 112. For example, if the user of computing device 110 inputs an extension time of 2 days, search program 112 may determine that the time range associated with event 1 is July $1^{st}$ to July $9^{th}$. Search program 112 then determines whether the input is detected within the certain time range (for example between July $1^{st}$ and July $9^{th}$). Furthermore, the extension time may be only used to extend the time prior to the event. Referring to example above, if the user of computing device 110 inputs an extension time of 2, search program 112 may determine that the time range associated with event 1 is July $1^{st}$ to July $7^{th}$. Additionally, the extension time may be only used to extend the time following the event.

In another embodiment, the certain time range is determined based on the location of the user of computing device 110. For example, the certain time range may be the time that the user of computing device 110 is located within a certain city, state, or within the location that a certain event is taking place. Search program 112 utilizes a GPS module in order to determine the location of the user of computing device 110, and therefore determine whether the input is received while the user of computing device 110 is located within the certain location. Additionally, in this embodiment, the user of computing device 110 may also input an extension time as described above.

If search program 112 determines that the input is not detected within the certain time range (decision 208, "NO" branch), search program 112 continues to monitor the input of the user of computing device 110.

If search program 112 determines that the input is detected within the certain time range (decision 208, "YES" branch), search program 112 provides an autocomplete suggestion for input into the search field (step 210). In the example embodiment, search program 112 provides autocomplete suggestions based on search terms utilized by the social media contacts associated with the user and the event(s). For example, search program 112 identifies search terms, social media comments, comments on social forums, and the like utilized by the determined social media contacts associated with the user and the event(s). In the example embodiment, search program 112 then utilizes natural language processing techniques and/or string matching techniques to determine one or more terms from the terms utilized by the determined social media contacts that are related to the event(s), such as the location of the event, speakers of the event, social interests/purpose for visit in relation to the event, or metadata related to the event (event invite, etc.). For example, search program 112 may utilize the techniques described above to identify terms or phrases which contain the name of the event, the name of the city, names of the speakers attending the event, names of participants attending the event, or any other terms related to the event (such as terms found in metadata associated with the event). Search program 112 then provides autocomplete suggestions utilizing the identified terms or phrases which are associated with the event. In addition, search program 112 utilizes character matching techniques in order to provide autocomplete suggestions that predict what the user of computing device 110 desires to input. For example, if event 1 is a football game and the identified terms and phrases utilized by the social media contacts of the user include the team name the "Frogs", the stadium name "Blenley Stadium", and "frogs stadium parking", if the user of computing device 110 inputs the character "f", search program 112 may provide autocomplete suggestion "Frogs", "The Frogs", or "frogs stadium parking". Additionally, if user of computing device 110 inputs "frogs s", search program 112 may provide the autocomplete suggestions "frogs stadium parking".

In the example embodiment, search program 112 provides autocomplete suggestions related to the event associated with the certain time range. Furthermore, if input corresponds to more than one time range detailed in event data 116, search program 112 may provide autocomplete suggestions based on multiple events.

In addition, in another embodiment, search program 112 may identify social media contacts associated with the user whose location matches the location of an event(s) associated with the certain time range. Search program 112 may then provide autocomplete suggestions based on one or more terms utilized by the identified social media contacts. For example, if event 1 or the destination of the user of computing device 110 is location A, search program 112 determines one or more social media contacts of the user of computing device 110 that are associated or are located in location A (by referencing location information provided on social media sites, professional networking sites, and the like). Furthermore, if search program 112, identifies the one or more terms utilized by the identified social media contacts to be "downtown festival", "all-day truck marathon", and "all you can eat rice", and the user of computing device 110 inputs the character "d", search program 112 may provide autocomplete suggestion "downtown festival". Additionally, if user of computing device 110 inputs "all," search program 112 may provide the autocomplete suggestions "all-day truck marathon" and "all you can eat rice." In this embodiment, search program 112 may utilize character matching techniques as described above. Furthermore, in the example embodiment, search program 112 may utilize natural language processing techniques when analyzing terms utilized by social media contacts in order to identify certain terms such as the subject or object of a sentence.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
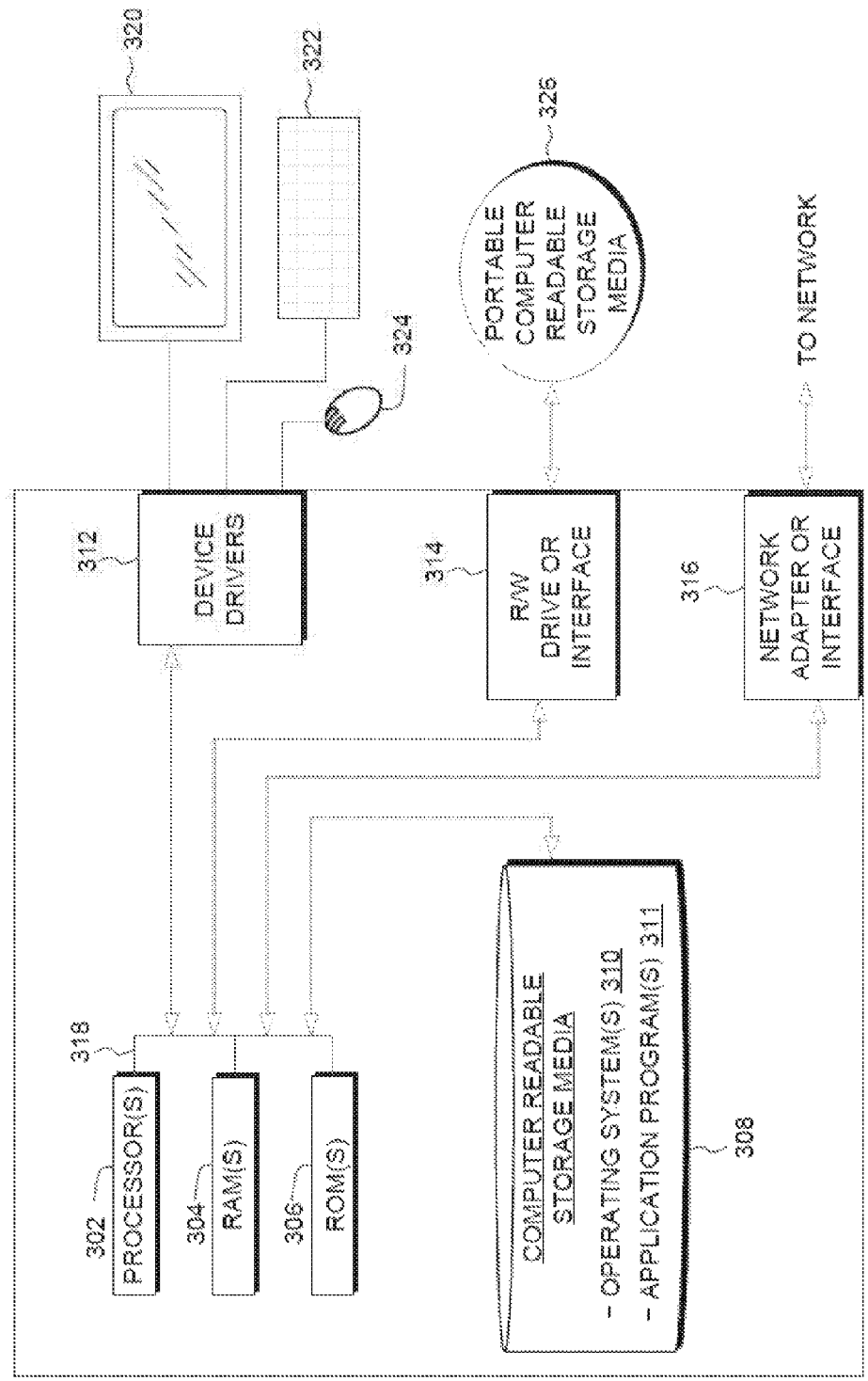
FIG. 3 is a block diagram depicting the hardware components of the autocomplete system of FIG. 1, in accordance with an embodiment of the invention.

FIG. 3 depicts a block diagram of components of computing device 110, and social media server 120 of an autocomplete system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110, and social media server 120 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, search program 112, user interface 114, event data 16 and social media site 122, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 and social media server 120 may also include a R/W drive or interface 314 to read from and write to one or more portable computer readable storage media 326. Application programs 311 on computing device 110 and social media server 120 may be stored on one or more of the portable computer readable storage media 326, read via the respective R/W drive or interface 314 and loaded into the respective computer readable storage media 308.

Computing device 110 and social media server 120 may also include a network adapter or interface 316, such as a TCP/IP adapter card or wireless communication adapter (such as a 4G wireless communication adapter using OFDMA technology). Application programs 311 on computing device 110 and social media server 120 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 and social media server 120 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining autocomplete suggestions, comprising the steps of:
   a computer receiving information detailing an event associated with a user;
   the computer determining one or more social media contacts associated with the event, wherein the social media contacts are further associated with the user;
   the computer determining one or more terms utilized by the determined one or more social media contacts;
   the computer detecting an input by the user, wherein the input includes one or more characters;
   the computer determining a start time and an end time associated with the event;
   the computer receiving a user input detailing an extension of time associated with the event;
   the computer applying the extension of time associated with the event to the start time and the end time of the event in order to determine a certain time range associated with the event, wherein the certain time range includes a time period ranging between a period of time prior to the start time of the event and a period of time after the end time of the event;

the computer determining whether the detected input has been entered within the certain time range;

based on determining that the detected input is within the certain time range: the computer identifying one or more search terms and one or more terms in social media comments utilized by the determined social media contacts that are associated with the event; and the computer determining one or more autocomplete suggestions based on the identified one or more search terms and one or more terms in social media comment utilized by the determined social media contacts, and further based on the information detailing the event.

* * * * *